(12) United States Patent
Inou et al.

(10) Patent No.: US 6,366,334 B1
(45) Date of Patent: Apr. 2, 2002

(54) METHOD AND APPARATUS FOR REMOVING REMOVAL PART IN LIQUID CRYSTAL DISPLAY DEVICE USING JET OF COMPRESSED AIR TO REMOVE PART OF THE SUBSTRATE

(75) Inventors: Ippei Inou, Nara; Hiroshi Mizusaki, Yamatokoriyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/573,107

(22) Filed: May 17, 2000

(30) Foreign Application Priority Data

May 17, 1999 (JP) ............................................. 11-135210

(51) Int. Cl.[7] ............................................. G02F 1/1333
(52) U.S. Cl. ...................................... 349/187; 349/158
(58) Field of Search ................................... 349/158, 187

(56) References Cited

U.S. PATENT DOCUMENTS

| 5,303,861 A | * | 4/1994 | Allaire et al. ................... 225/2 |
| 5,475,196 A | * | 12/1995 | Lisec ..................... 219/121.39 |
| 5,492,582 A | * | 2/1996 | Ide et al. .................... 156/106 |
| 6,236,446 B1 | * | 5/2000 | Izumi et al. ................. 349/187 |
| 6,190,489 B1 | * | 2/2001 | Akitomo et al. ............ 156/238 |

FOREIGN PATENT DOCUMENTS

| JP | 5-45617 | | 2/1993 | |
| JP | 05088136 A | * | 4/1993 | .............. G02F/1/13 |
| JP | 05333299 A | * | 12/1993 | .............. G02F/1/13 |
| JP | 2000321561 A | * | 11/2000 | ......... G02F/1/1333 |

* cited by examiner

Primary Examiner—Toan Ton
Assistant Examiner—Andrew Schechter
(74) Attorney, Agent, or Firm—Dike, Bronstein, Roberts & Cushman; David G. Conlin

(57) ABSTRACT

The purpose of the present invention is to provide a method for manufacturing a liquid crystal display device which can easily remove a removal part even from the liquid crystal display device using substrates made of thermoplastic resin. The liquid crystal display device is constructed by sticking the first and second substrates made of thermoplastic resin to each other using a sealing material. A dividing line is formed on the first substrate by a dicing method which is a half cut with a predetermined remaining thickness so that the removal part within the first substrate becomes easy to be removed. A jet of compressed air is emitted into between the first substrate the half cut is performed on and the second substrate so as to lift up the removal part. The jet of compressed air is emitted in the diagonal direction toward the liquid crystal display device. When the jet of compressed air is emitted, a removal head is inserted between the removal part and a terminal area so as to remove the removal part.

8 Claims, 10 Drawing Sheets

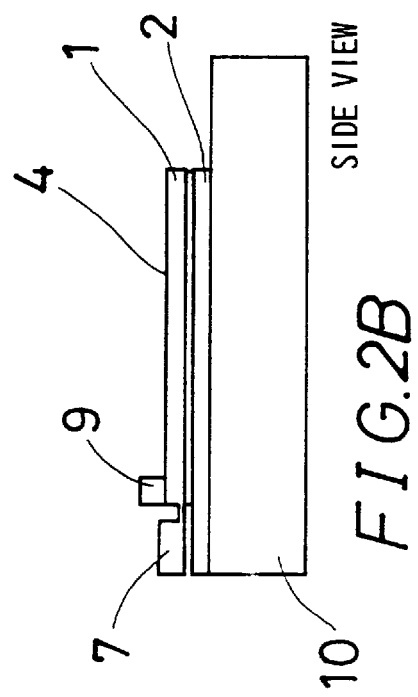
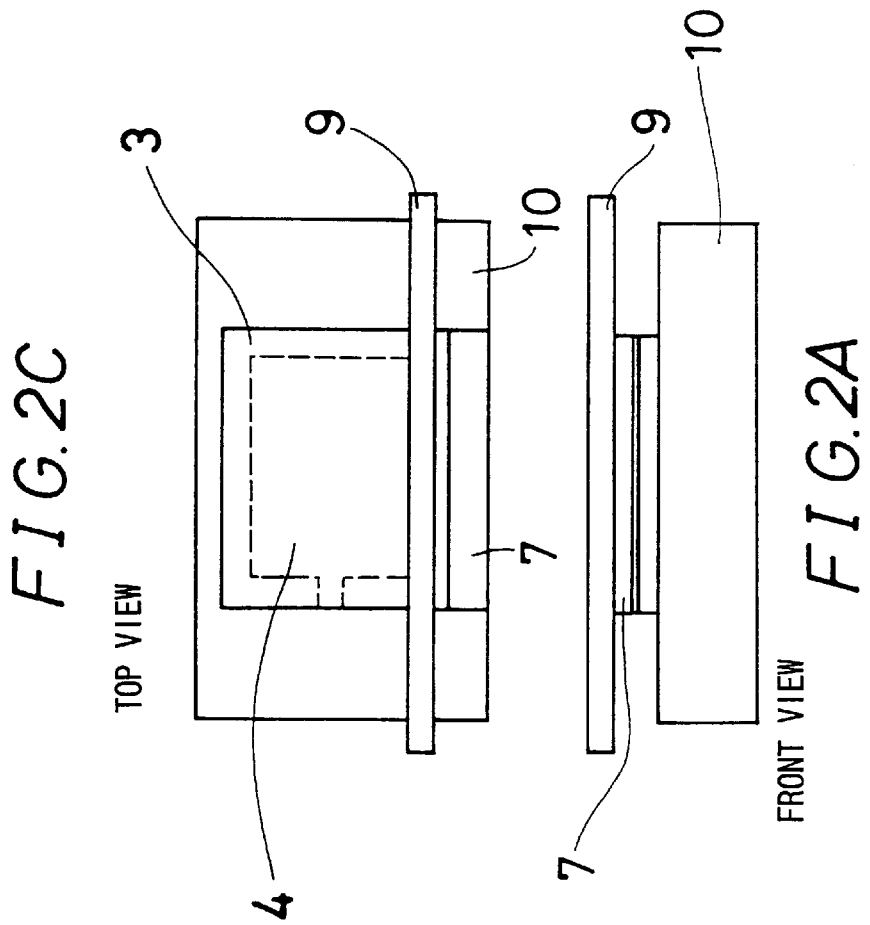
FIG. 2B SIDE VIEW
FIG. 2C TOP VIEW
FIG. 2A FRONT VIEW

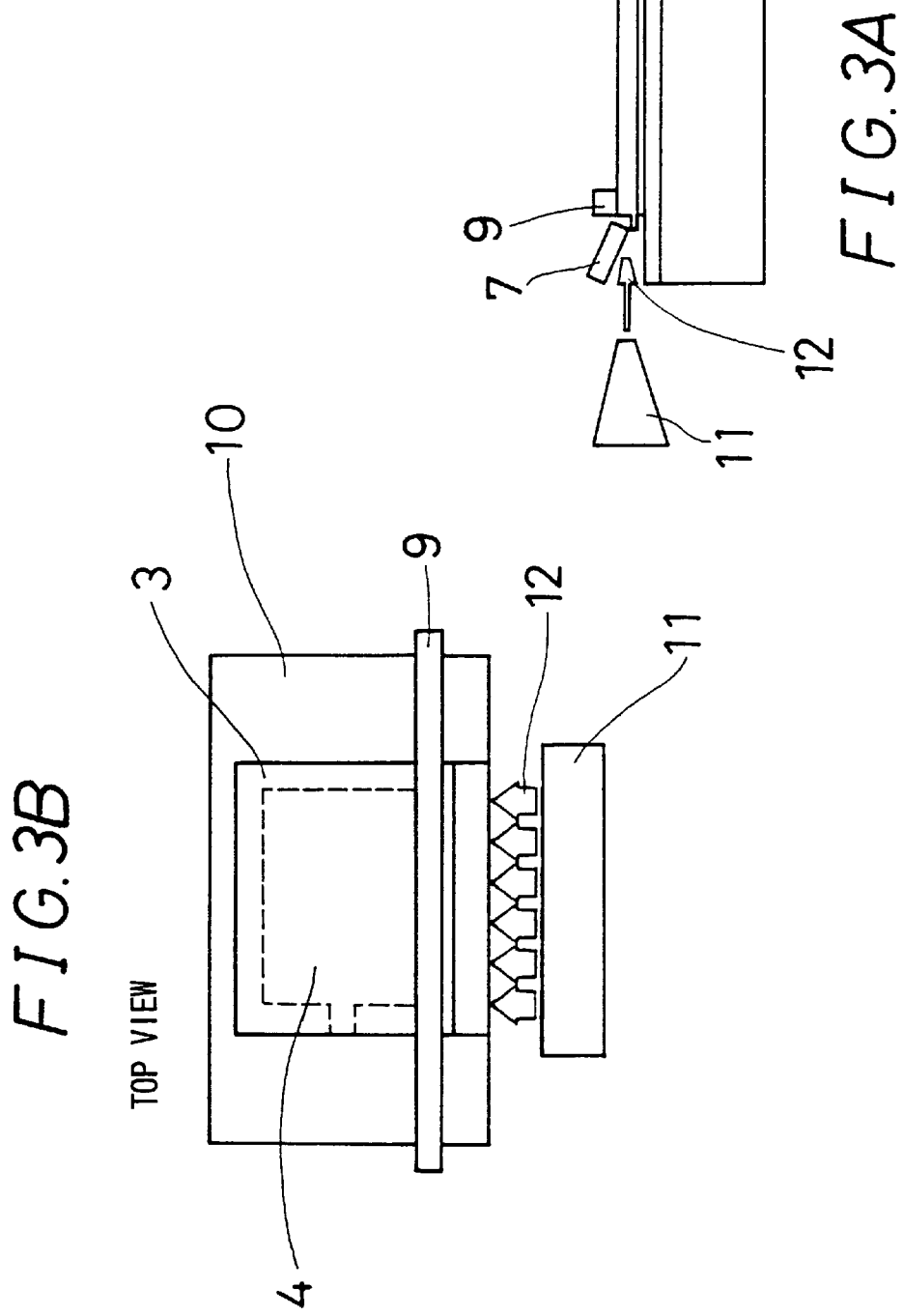

SIDE VIEW

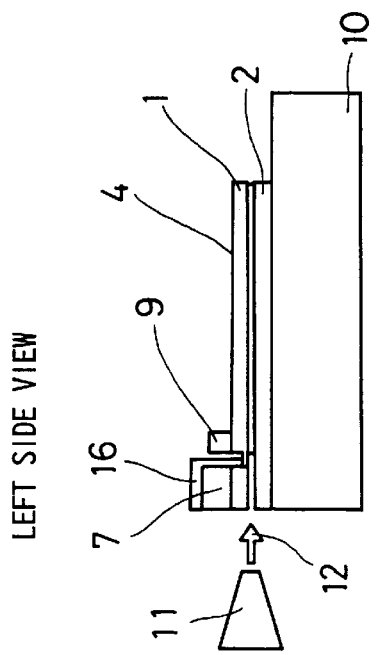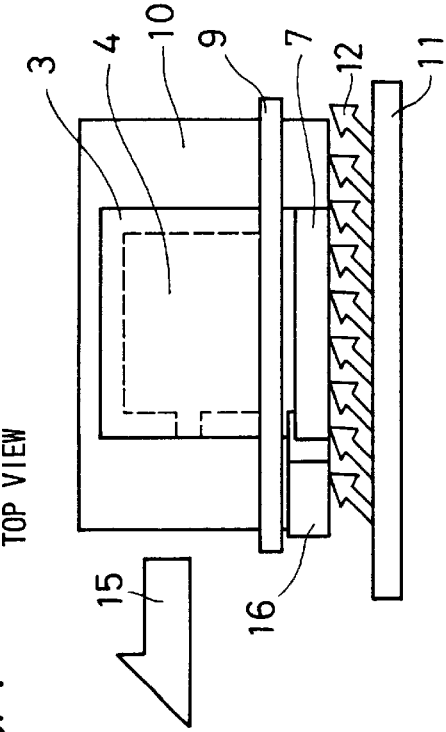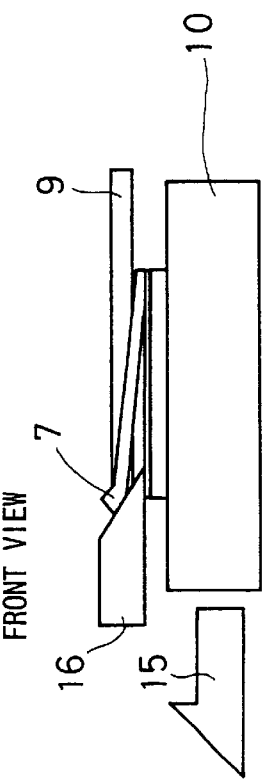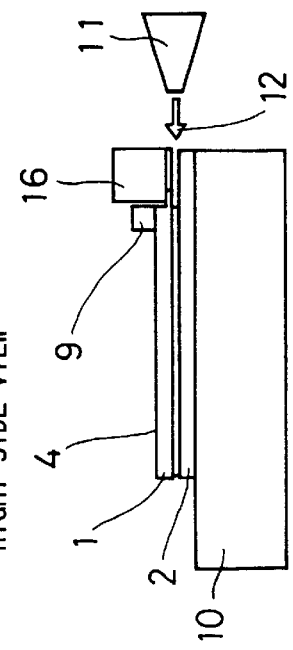

METHOD AND APPARATUS FOR REMOVING REMOVAL PART IN LIQUID CRYSTAL DISPLAY DEVICE USING JET OF COMPRESSED AIR TO REMOVE PART OF THE SUBSTRATE

BACKGROUND OF THE INVENTION

1. Field of the Invention

The present invention relates to a method for manufacturing a liquid crystal display device, in particular, to a method for manufacturing a plastic liquid crystal display device.

2. Description of the Related Art

A liquid crystal display device generally has a configuration where a pair of substrates which are opposed to each other with a predetermined gap and have electrodes for forming a terminal and display electrodes, are bonded via a sealing material to each other at a bonding region that is provided along an outer periphery of the substrates, a liquid crystal is sealed in a space enclosed by the substrates and the sealing material to form a display part, and a terminal part is provided outside of the layer of the sealing material.

In the terminal part, electrodes to be used as terminals are formed on only one of the substrates, namely no electrodes to be used as terminals are formed in a part of the other substrate, opposite to the terminals, and therefore the part needs to be removed. This part to be removed is called removal part and a process for removing the removal part is called a terminal exposure process.

In the case where the liquid crystal display device uses substrates made of glass, the removal of the removal part can be carried out by drawing a dividing line with a diamond cutter or the like on the upper and lower sides of the substrates under the condition that the pair of the substrates are bonded to each other, and by dividing the pair of the substrates simultaneously with the added pressure along the dividing line, which is not such a difficult process.

In the case of substrates made of thermosetting resin having a thickness of approximately 0.4 mm, the removal part is removed by dividing the substrates with a highly precise blade rotating at high speed (hereinafter referred to as a dicing method) as proposed in the Japanese Unexamined Patent Publication JP-A 5-45617 (1993). To remove the removal part, the substrates are remained uncut by a predetermined thickness, which is then torn off to be removed. The removal part can be removed comparatively easily by tearing off, since the thermosetting resin is hard and rigid.

On the other hand, in the case where the liquid crystal display device uses substrates made of thermoplastic resin, having a thickness of approximately 0.1 mm, a method is proposed for punching out the removal part before the pair of substrates are bonded to each other. In this method, a flash may be generated on the orientation film when the fitting for punching out is pulled away from the substrates in the case where the punching-out is carried out from the side of the orientation film, and the stage or the like contacts the orientation film too closely, which is not preferable because a defective orientation may be caused, in the case where the punching-out is carried out from the opposite side of the orientation film. However, the substrates have a thickness of approximately 0.1 mm, this affect of the flash is small.

In the case where the liquid crystal display device uses substrates made of thermoplastic resin having a thickness larger than approximately 0.2 mm, however, the affect of the flash described above becomes larger, which causes improper sell thickness and makes the display quality worse, therefore the method for punching out the removal part can not be employed.

Compared to thermosetting resin, thermoplastic resin such as PES (polyether sulfone) or PC (polycarbonate) is more flexible and have stronger tensile strength, which makes it difficult to employ the tearing-off method as described in the above. At this time, in the case where the removal part is forced to be removed, the sealing material adhering the pair of substrates may be pealed off from the substrates. In particular, in the case where the liquid crystal material is infiltrated into the terminal part when the liquid crystal material is injected, the pair of substrates may be contacted closely via the liquid crystal material, which makes it more difficult to remove the removal part.

SUMMARY OF THE INVENTION

An object of the invention is to provide a method for manufacturing a liquid crystal display device and an apparatus for removing a removal part from a liquid crystal display device, capable of easily removing the removal part even in a liquid crystal display device using substrates made of thermoplastic resin.

The invention provides a method for manufacturing a liquid crystal display device comprising the steps of:

bonding a first substrate on which terminals and display electrodes are formed and a second substrate on which display electrodes are formed, via a sealing material to each other at a bonding region which is provided along an outer periphery of the substrates so as not to surround the terminals, so that the display electrodes face each other;

forming a display part by injecting a liquid crystal material in a space enclosed by the sealing material and the substrates;

providing a half cut line along a border of a removal part which is a part of the second substrate and faces the terminal on a part of the first substrate outside of the sealing material; and exposing the terminal by removing the removal part along the half cut line, wherein the removal part is lifted up along the half cut line by emitting a jet of compressed air into between the part of the first substrate with the terminals formed thereon and the removal part.

According to a method for manufacturing a liquid crystal display device of the invention, a half cut line is formed on the second substrate and the removal of the removal part is started with emitting a jet of compressed air into between a part of the first substrate with a terminal formed thereon and the removal part which is a part of the second substrate. Thereby, the removal part is lifted up along the half cut line and at the same time liquid crystal material, which has been infiltrated into the terminal part when the liquid crystal material is injected, can be blown off. Accordingly, the first and second substrates can be prevented from being closely contacted each other by the liquid crystal material.

In the method of the invention it is preferable that the removal part is completely removed by inserting removal part removing means between a part of the first substrate with terminals formed thereon and the removal part.

According to the invention, the removal part removing means is inserted between a part of the first substrate with the terminal formed thereon and the removal part, which removal part removing means lifts up the removal part so that a jet of compressed air can lift up the removal part, thereby the removal part can be easily removed. At this time, since the removal part is lifted up by the compressed air, the removal part removing means can be easily inserted between the first substrate and the removal part.

In the method of the invention it is preferable that the compressed air is emitted as a jet in the diagonal direction toward the liquid crystal display device instead of in the opposite direction to the insertion of the removal part removing means.

According to the invention, by emitting compressed air as a jet in the diagonal direction toward the liquid crystal display device instead of in the opposite direction to the insertion of the removal part removing means, the compressed air is emitted as a jet from diagonally behind the removal part removing means so that the removal part removing means can remove the removal part with an aid of the compressed air.

In the method of the invention it is preferable that the first and second substrates are made of thermoplastic resin.

According to the invention, the removal part can be easily removed even in the case where the first and second substrates are made of thermoplastic resin.

In the method of the invention it is preferable that the jet of compressed air is emitted under the condition that at least a part, on which a layer of the sealing material is formed in the vicinity of the half cut line, is pressed down.

According to the invention, in the method for manufacturing a liquid crystal display device, a part, on which a layer of the sealing material is provided in the vicinity of the half cut line within the liquid crystal display device, is pressed down so that the liquid crystal display device is secured while a jet of compressed air is being emitted. Thereby the display surface of the liquid crystal display device is not pressed without damaging the display quality of the liquid crystal display device, and the sealing material can be prevented from being pealed off from the substrate while the removal part is being removed.

The invention provides an apparatus for removing a removal part from a liquid crystal display device manufactured by a process comprising providing a first substrate on which terminals and display electrodes are formed and a second substrate on which display electrodes are formed; bonding the first substrate and the second substrate to each other via a sealing material at a bonding region which is provided along an outer periphery of the substrates so as not to surround the terminals, so that the display electrodes face each other; forming a display part by injecting a liquid crystal material in a space enclosed by the sealing material and the substrates; providing a half cut line along a border of a removal part which is a part of the second substrate and faces the terminals on a part of the first substrate outside of the sealing material; and exposing the terminals by removing the removal part along the half cut line, the apparatus comprising:

means for sucking the liquid crystal display device onto a suction stage; and means for supplying compressed air into between the removal part of the liquid crystal display device and the first substrate.

According to the invention, an apparatus for removing a removal part removes the removal part, which is a part facing a terminal within the second substrate, from a liquid crystal display device which is formed by sealing liquid material between the first substrate, on which a display electrode and a terminal are formed, and the second substrate, on which a display electrode is formed. Thereby, the apparatus for removing the removal part sucks the liquid crystal display device onto a suction stage after a half cut line is provided along a border of the removal part on the second substrate, and supplies compressed air between the removal part and the first substrate. As a result, the removal part is lifted up by the compressed air so that the liquid crystal material, which has been infiltrated between the removal part and the first substrate, is blown off, therefore the terminal can be easily exposed without fail.

In the apparatus of the invention it is preferable that the apparatus further comprises securing means for securing the second substrate of the liquid crystal display device.

According to the invention, the apparatus for removing a removal part further uses not only a suction stage but also a securing means for securing the second substrate, at the time a jet of compressed air is emitted, so that the liquid crystal display device is secured. Thereby, the apparatus for removing a removal part can lift up only the removal part by using compressed air.

In the apparatus of the invention it is preferable that the apparatus further comprises a removal head for contacting the removal part to remove the removal part from the liquid crystal display device.

According to the invention, the apparatus for removing a removal part removes the removal part by using not only compressed air but also a removal head. Since the removal part is lifted up by compressed air, it becomes possible to easily insert the removal head into between the removal part and the first substrate so that only the removal part is contacted. Thereby the apparatus for removing a removal part can surely remove the removal part without damaging the terminal.

BRIEF DESCRIPTION OF THE DRAWINGS

Other and further objects, features, and advantages of the invention will be more explicit from the following detailed description taken with reference to the drawings wherein:

FIGS. 2A to 2C show views for describing a securing method for a liquid crystal display device when removal part is removed;

FIGS. 3A and 3B show views for illustrating a method for lifting up the removal part;

FIGS. 6A to 6D show views illustrating a way of removing the removal part by the removal head;

DETAILED DESCRIPTION OF THE PREFERRED EMBODIMENTS

Figure 1A:
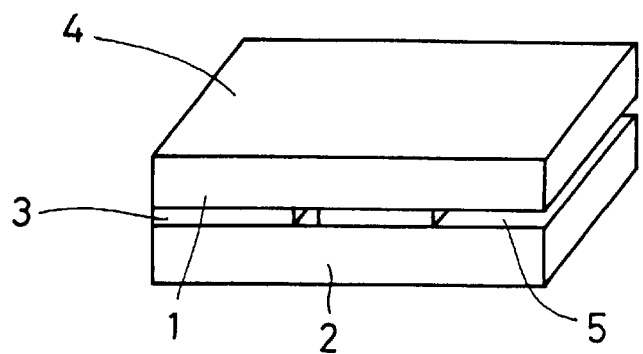
FIGS. 1A to 1C show views for describing a terminal exposure process according to the invention.

Now referring to the drawings, preferred embodiments of the invention are described below.

Figure 1B:
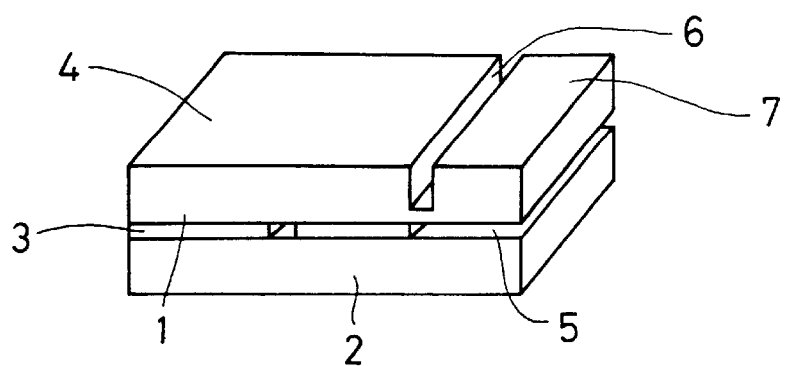
Figure 1C:
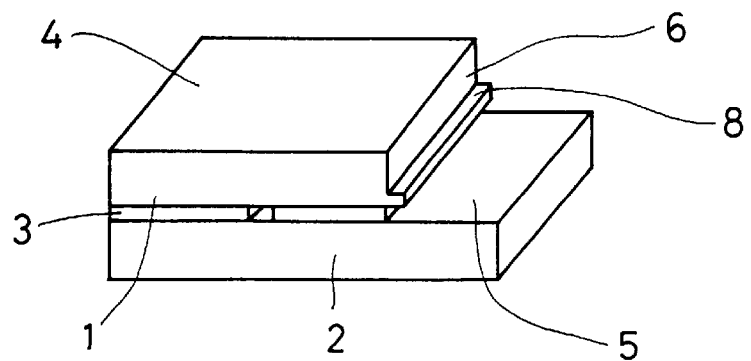

A terminal exposure process according to the invention is briefly described in reference to FIGS. 1A to 1C. FIGS. 1A to 1C show views for describing a terminal exposure process according to the invention.

As shown in FIG. 1A, a liquid crystal display device is constructed by sticking the first substrate 1 made of thermoplastic resin such as PES or PC with a thickness of approximately 0.2 to 0.5 mm and the second substrate to each other using a sealing material 3 so that liquid crystal material is sealed in between the first substrate 1, the second substrate 2 and the sealing material 3. Here, the display surface of the liquid crystal display device is denoted as 4 and a terminal area where a terminal is formed is denoted as 5. Not only a terminal but also a display electrode, an orientation film and the like are formed on each substrate prior to a process of sticking the substrates to each other, which is not shown. Even in the case where a plurality of liquid crystal display devices are manufactured from a pair of substrates, the invention can be of course applied.

Then, as shown in FIG. 1B, the removal part 7 is set in a form which can be easily removed by cutting the first substrate along the border of the removal part 7 to a predetermined remaining thickness through a dicing method in order to form a half cut line 6 in a trench form on the first substrate 1 (hereinafter referred to as a half cut).

FIG. 1C shows an exposure of the terminal area 5 after the removal part 7 is removed. Here, the remaining part of the half cut line is denoted as 8. The terminal exposure process is described in the above.

Next, the terminal exposure process is described in detail in reference to FIGS. 2 to 10. The method described above for removing the removal part 7 shown in FIG. 1C is described in the following.

As shown in FIGS. 2A to 2C, the liquid crystal display device on which the half cut is carried out is sucked and secured onto the suction stage 10 of the removal part dividing apparatus. The suction stage 10 may be either a porous plate or a plate having suction holes. A securing stick for securing the liquid crystal display device is denoted as 9.

Here, as shown in the side view of FIG. 2B and in the top view of FIG. 2C, the end surface of the suction stage 9 and the end surface of the liquid crystal display device are preferably trued up. In the case where the end surface of the liquid crystal display device is recessed from the end surface of the suction stage, the compressed air may be defused at the end surface of the suction stage 10 when a jet of compressed air is emitted later, which fails to fully lift up the removal part 7. On the contrary, in the case where the end surface of the liquid crystal display device sticks out from the end surface of the suction stage 10, a jet of compressed air may work as a force to peal off the liquid crystal display device from the suction stage 10 when the jet of compressed air is emitted later, which fails to fully lift up the removal part 7.

The securing stick 9 of the removal part removing apparatus is arranged so as to secure the liquid crystal display device by pressing the part where the layer of sealing material 3 is formed without pressing the display surface 4. Thereby, an inferior sell thickness or a defective orientation caused by pressing the display surface 4 can be prevented from occurring, which can do without damaging the display quality of the liquid crystal display device, and at the same time the sealing material 3 can be prevented from being pealed off from the substrate while the removal part 7 is being removed.

Then, as shown in FIGS. 3A and 3B, a jet of compressed air 12 is emitted from a blower 11 of the removal part removing apparatus into between the first substrate and the removal part. The jet of compressed air 12 is preferably emitted with a pressure of approximately 3 to 5 kg/cm$^2$. By this jet of compressed air 12 the removal part 7 can be lifted up and the liquid crystal material, which has been infiltrated between the removal part and the first substrate when the liquid crystal material is injected, can be blown off.

Figure 4:
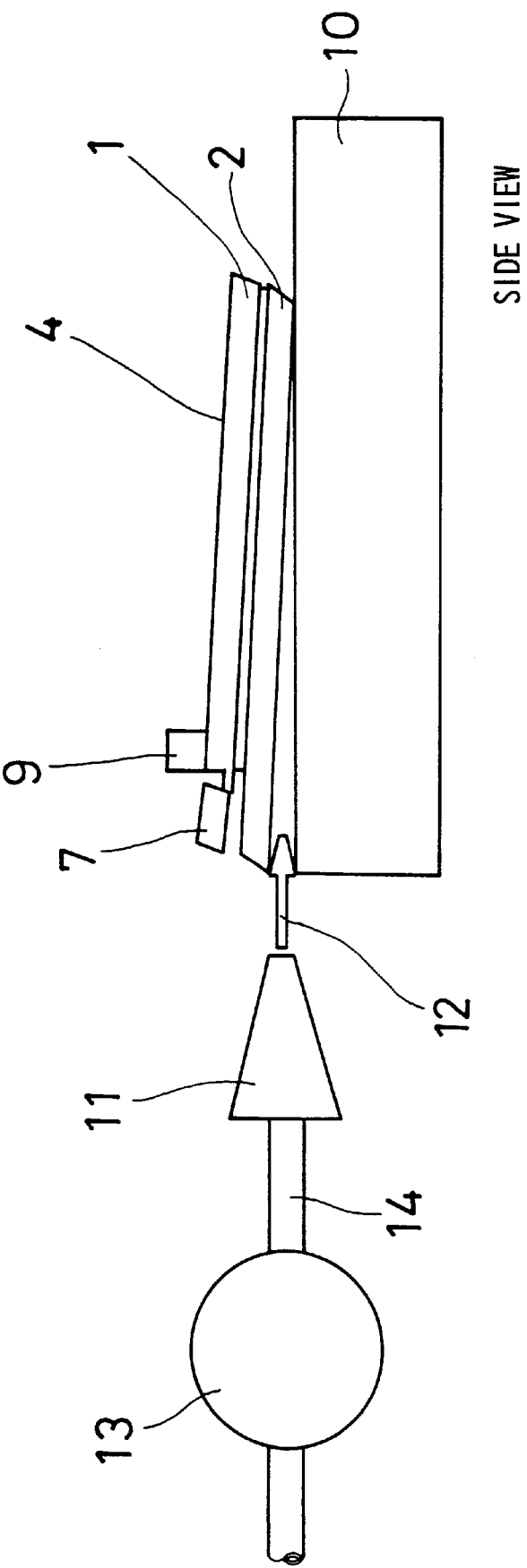
FIG. 4 is a side view illustrating a way how a liquid crystal display device is pealed off from a suction stage in the case where the pressure of compressed air is high.

In order to adjust the pressure of compressed air 12, as shown in FIG. 4, a regulator 13 is provided on the way of the pipe line 14 for supplying air to the blower 11 so as to be able to vary the pressure of emitted air arbitrarily. In the case where the level of lifting up of the removal part 7 is improper, the pressure is raised by the regulator 13. In the case where the pressure of the compressed air 12 exceeds the pressure of the securing stick 9 and the suction power of the suction stage 10 so that the liquid crystal display device is pealed off from the suction stage 10 as shown in FIG. 4, the pressure is lowered by the regulator 13.

Figure 5:
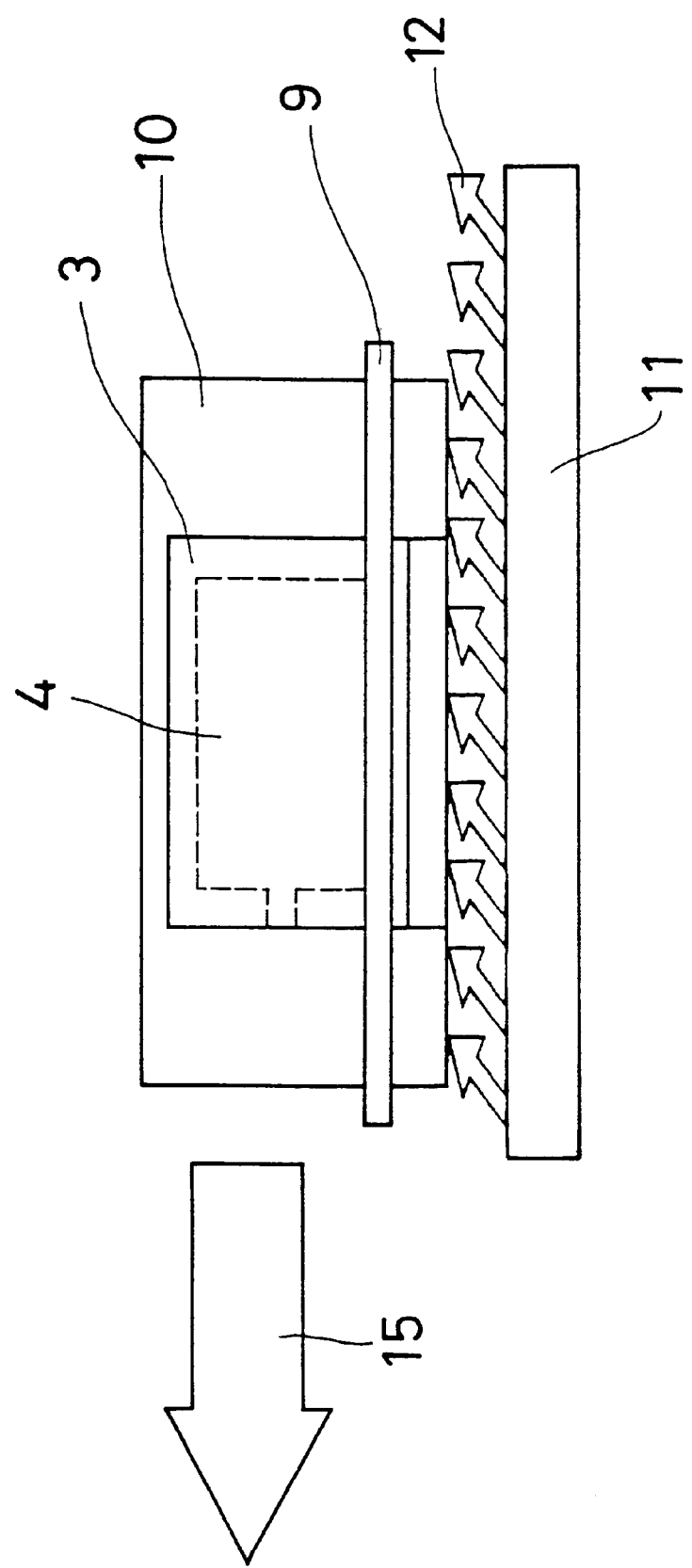
FIG. 5 is a plan view illustrating a way how a jet of compressed air is emitted while moving the suction stage.
Figure 7:
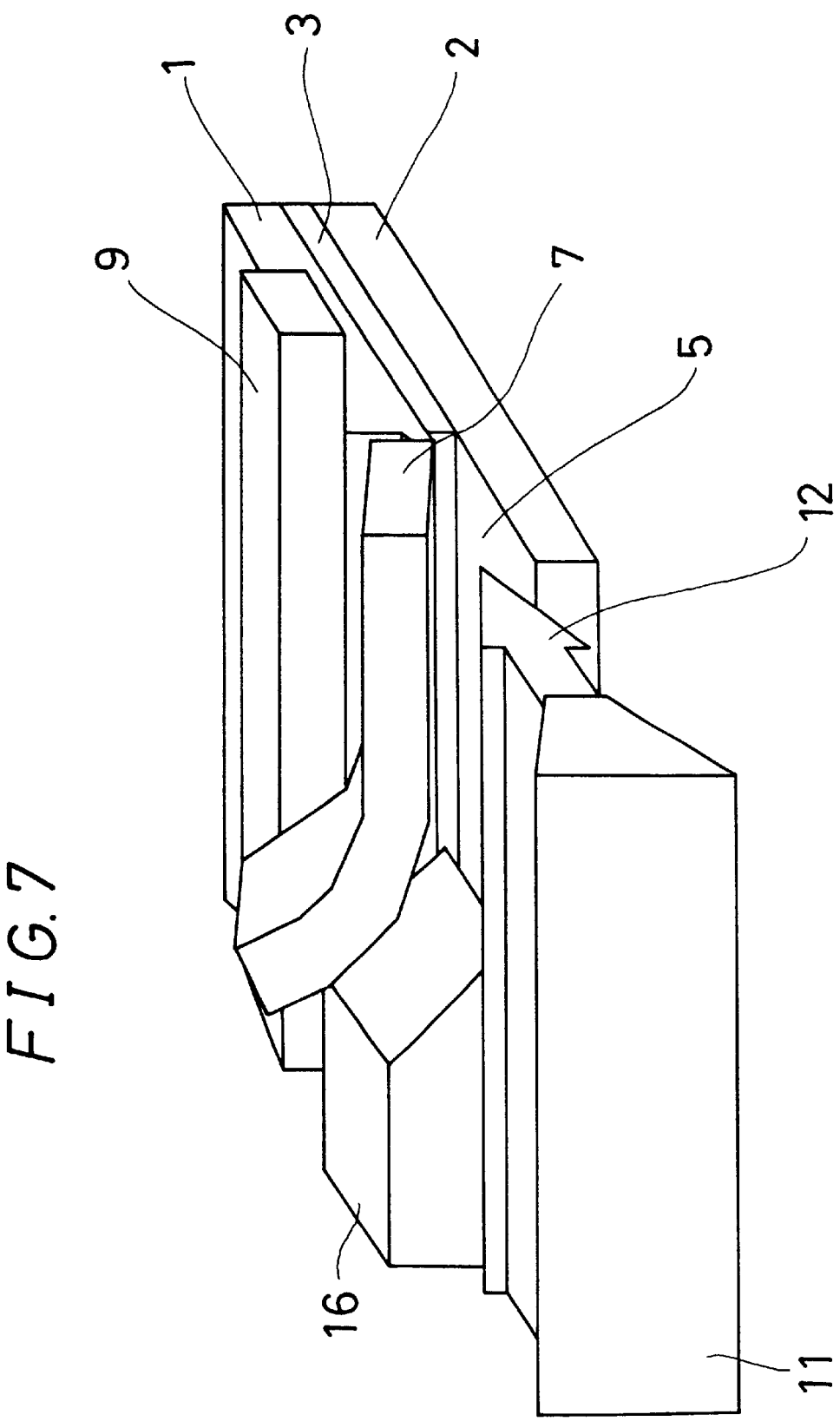
FIG. 7 is a perspective view gained by expanding FIGS. 6A to 6D.
Figure 8:
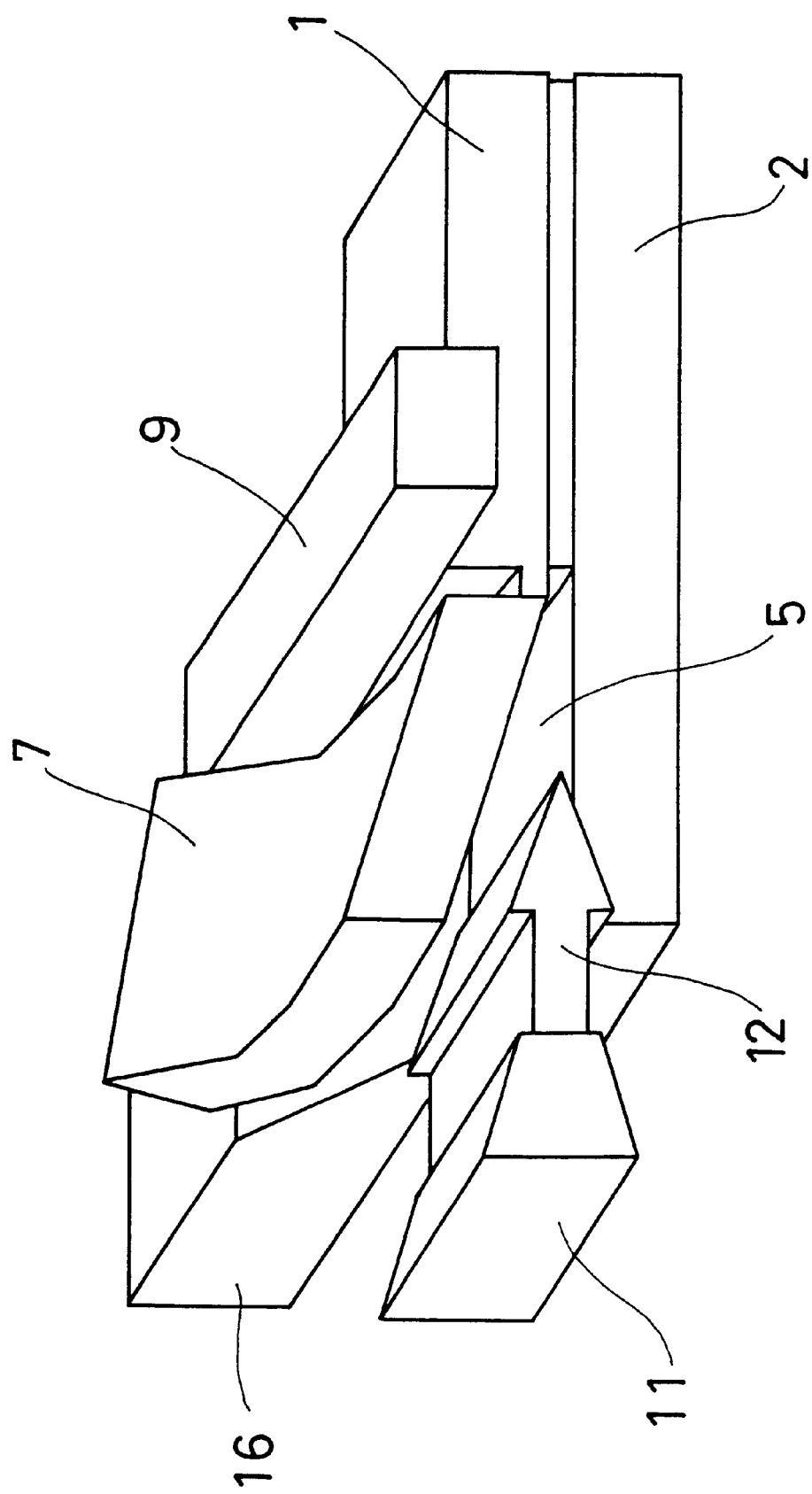
FIG. 8 is a perspective view gained by seeing FIG. 7 in a different direction.

When the jet of compressed air 12 is emitted, as shown in FIG. 5, it is preferable to emit the jet of compressed air 12 from the blower 11 while moving the suction stage 10 in the direction of the movement shown as an arrow. By doing this, a jet of the compressed air 12 is emitted in the direction of the movement 15 of the suction stage 10, that is to say in the diagonal direction toward the liquid crystal display device.

When the jet of compressed air 12 is emitted, as shown in FIGS. 6A to 6D, 7 and 8, it is also preferable to remove the removal part 7 by inserting a tapered removal head (removal part removing means) 16 from the side between the removal part 7 and the terminal area 5. The jet of compressed air 12 is being emitted from the blower 11 to lift up the removal part 7 even while the removal head 16 is being inserted between the removal part 7 and the terminal area 5. Here, the removal head 16 is set so as not to contact the terminal because the terminal may be damaged when the removal head 16 contacts the terminal. According to the present embodiment, the gap with the terminal is set at 0.1 mm.

In this way, the removal part removing apparatus lifts up the removal part 7 by emitting a jet of compressed air 12 from the blower 11 so as to completely remove the removal part 7 by the removal head 16. Since the removal part 7 is lifted up by the compressed air 12, the removal head 16 can be easily inserted between the removal part 7 and the terminal area 5.

By emitting the jet of compressed air 12 in the diagonal direction toward the liquid crystal display device instead of in the opposite direction to the insertion of the removal head 16, the jet of the compressed air 12 is emitted in the direction diagonally from behind the removal head 16 so that the removal head 16 can remove the removal part 7 with an aid of the compressed air 12.

Figure 9:
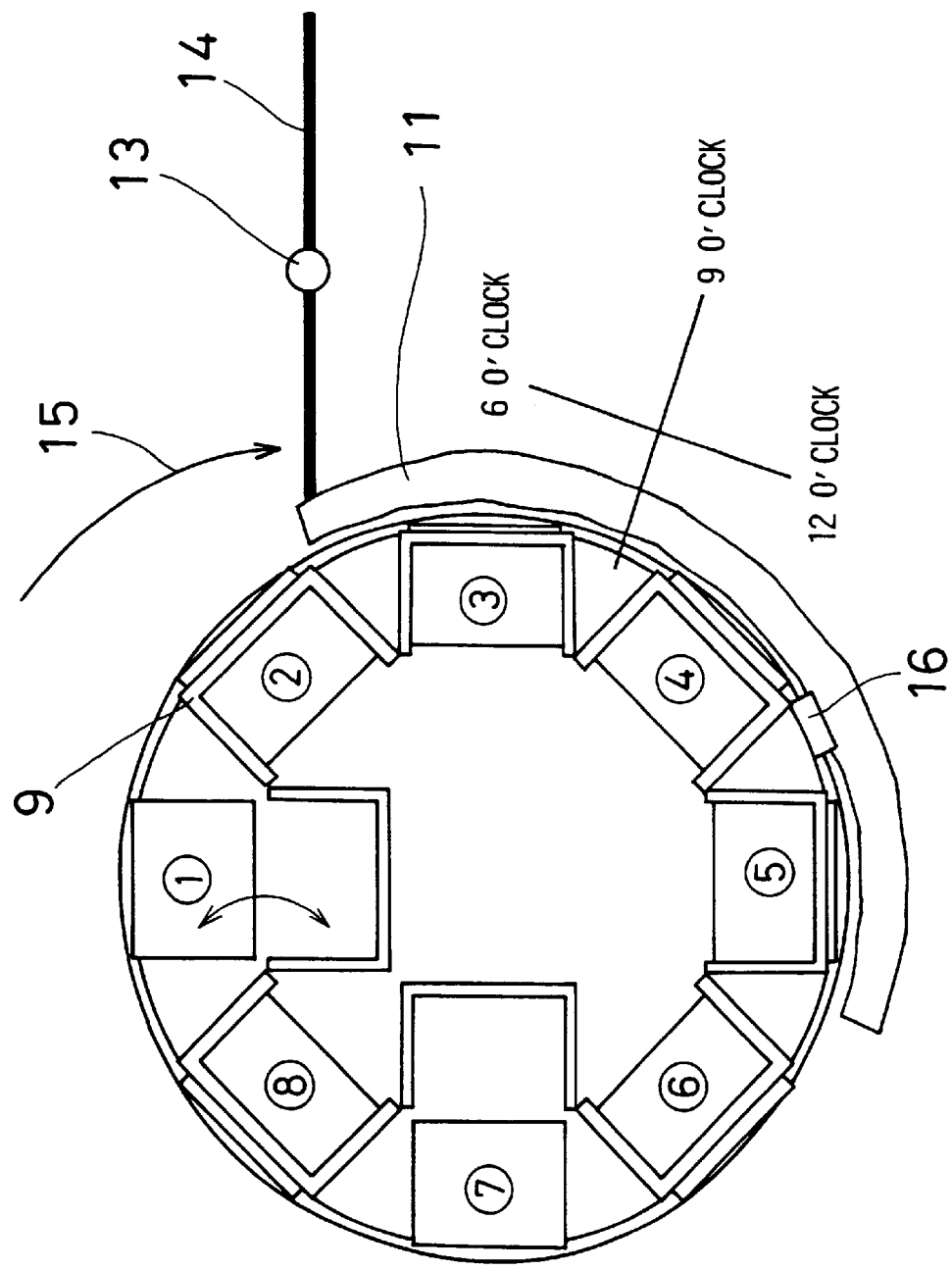
FIG. 9 shows a view for describing an example of an apparatus used for the removing process of the removal part.
Figure 10:
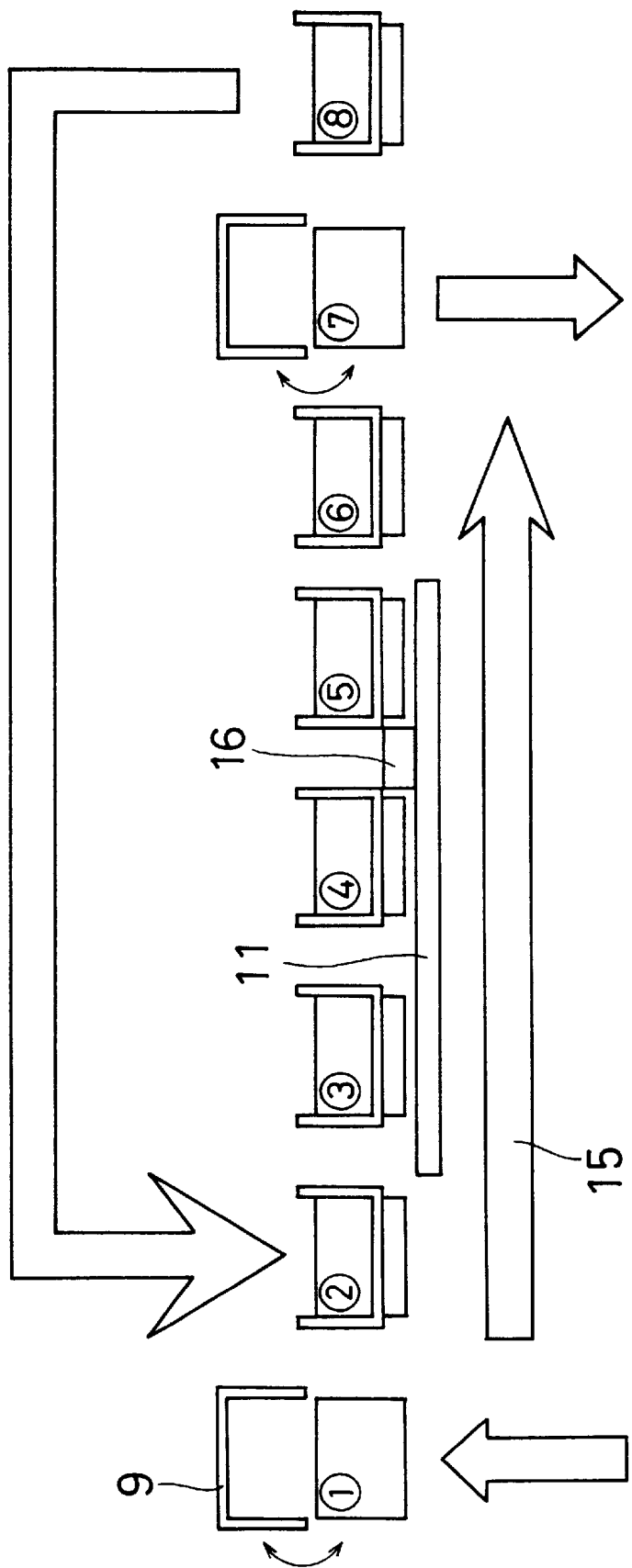
FIG. 10 shows a view for describing another example of an apparatus used for the removing process of the removal part.

A removal process for removing the removal part 7 in a terminal exposure process as described above may be arranged in a circle as shown in FIG. 9 or may be arranged in a line as shown in FIG. 10. The arrangement may also be bent in a L-shape in an arbitrary process, may be arranged in a T-shape or may be arranged in a polygonal shape or in a 2 story form.

An example of the process for removing the removal part 7 is described in reference to FIG. 9 as follows. First, the liquid crystal display device is sucked and secured after the alignment so as to be moved along the direction of the movement 15 along the rotation direction of the apparatus at step s1 and the liquid crystal display device is secured by the securing stick 9 at step s2. Then, while moving from step s3 to step s4, a jet of compressed air 12 is emitted from the blower 11 arranged in the periphery of a circle. At this time, the direction of the jet of compressed air 12 being emitted is assumed to be in the direction of between 3 o'clock and 6 o'clock on the clock face when the direction of the movement 15 of the liquid crystal display device is assumed to be in the direction of 12 o'clock. While moving from step s4 to step s5, the removal part 7 is completely removed from the liquid crystal display device by the removal head 16 and during this time the jet of compressed air 12 is kept emitting to the liquid crystal display device.

The removal part 7 is completely removed at step 5, of which the condition is where the terminal is exposed. Then the condition of removing the removal part 7 is confirmed at step s6 and in the case where the removal part 7 is completely removed, the liquid crystal display device is taken out of the apparatus after the securing by the securing stick 9 and the suction by the suction stage 10 are released at step s7. In the case where the removal part 7 remains at step s6, the procedure returns to step s1 through the buffer step s8.

Another example of a process for removing the removal part 7 in reference to FIG. 10 is described as follows. First, the liquid crystal display device is sucked and secured after the alignment at step s1 so as to be moved in the direction of the movement 15 shown as an arrow, then the liquid crystal display device is secured by the securing stick 9 at step s2. Then while moving the liquid crystal display device from step s3 to step s4, a jet of compressed air 12 is emitted from the blower 11 placed along the direction of the movement 15. While moving the liquid crystal display device from step s4 to step s6, the removal part 7 is completely removed from the liquid crystal display device by the removal head 16, the jet of compressed air 12 is kept emitted to the liquid crystal display device during this time.

The removal part 7 is completely removed at step s6, of which the condition is where the terminal is exposed. Then, the removal condition of the removal part 7 is confirmed at step s6 so as to take out the liquid crystal display device from the apparatus after releasing the securing by the securing stick 9 and the suction by the suction stage 10 at step s7 in the case where the removal part 7 is completely removed. In the case where the removal part 7 remains at step s6, the procedure returns to step s2 through the buffer step s8.

As described above, according to a method for manufacturing a liquid crystal display device according to the invention, it becomes possible to easily carry out a terminal exposure process of the liquid crystal display device using substrates made of thermoplastic resin particularly having a thickness of approximately 0.2 mm to 0.5 mm, which used to be difficult conventionally.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for manufacturing a liquid crystal display device comprising the steps of:
   bonding a first substrate on which terminals and display electrodes are formed and a second substrate on which display electrodes are formed, via a sealing material to each other at a bonding region which is provided along an outer periphery of the substrates so as not to surround the terminals, so that the display electrodes face each other;
   forming a display part by injecting a liquid crystal material in a space enclosed by the sealing material and the substrates;
   providing a half cut line along a border of a removal part which is a part of the second substrate and faces the terminal on a part of the first substrate outside of the sealing material; and
   exposing the terminal by removing the removal part along the half cut line,
   wherein the removal part is lifted up along the half cut line by emitting a jet of compressed air into between the part of the first substrate with the terminals formed thereon and the removal part.

2. The method for manufacturing a liquid crystal display device of claim 1, wherein the removal part is completely removed by inserting removal part removing means between a part of the first substrate with terminals formed thereon and the removal part.

3. The method for manufacturing a liquid crystal display device of claim 2, wherein the compressed air is emitted as a jet in the diagonal direction toward the liquid crystal display device instead of in the opposite direction to the insertion of the removal part removing means.

4. The method for manufacturing a liquid crystal display device of claim 1, wherein the first and second substrates are made of thermoplastic resin.

5. The method for manufacturing a liquid crystal display device of claim 1, wherein the jet of compressed air is emitted under the condition that at least a part, on which a layer of the sealing material is formed in the vicinity of the half cut line, is pressed down.

6. An apparatus for removing a removal part of a liquid crystal display device manufactured by a process comprising providing a first substrate on which terminals and display electrodes are formed and a second substrate on which display electrodes are formed; bonding the first substrate and the second substrate to each other via a sealing material at a bonding region which is provided along an outer periphery of the substrates so as not to surround the terminals, so that the display electrodes face each other; forming a display part by injecting a liquid crystal material in a space enclosed by the sealing material and the substrates; providing a half cut line along a border of a removal part which is a part of the second substrate and faces the terminals on a part of the first substrate outside of the sealing material; and exposing the terminals by removing the removal part along the half cut line,
   the apparatus comprising:
   means for sucking the liquid crystal display device onto a suction stage; and
   means for supplying compressed air into between the removal part of the liquid crystal display device and the first substrate.

7. The apparatus for removing a removal part of a liquid crystal display device of claim 6, further comprising:
   securing means for securing the second substrate of the liquid crystal display device.

8. The apparatus for removing a removal part of a liquid crystal display device of claim 7, further comprising:
   a removal head for contacting the removal part to remove the removal part from the liquid crystal display device.

* * * * *

UNITED STATES PATENT AND TRADEMARK OFFICE
CERTIFICATE OF CORRECTION

PATENT NO. : 6,366,334 B1
DATED : April 2, 2002
INVENTOR(S) : I. Inou et al.

It is certified that error appears in the above-identified patent and that said Letters Patent is hereby corrected as shown below:

<u>Title page,</u>
Item [30], Foreign Application Priority Data
May 17, 1999 (JP) ………….. replace "11-135210" with -- 11-135120 --

Signed and Sealed this

Twenty-ninth Day of April, 2003

JAMES E. ROGAN
*Director of the United States Patent and Trademark Office*